(12) United States Patent
Marini et al.

(10) Patent No.: US 10,018,150 B2
(45) Date of Patent: Jul. 10, 2018

(54) INTEGRATED TEC/MIXER STRUT AXIAL POSITION

(71) Applicant: PRATT & WHITNEY CANADA CORP., Longueuil (CA)

(72) Inventors: Remo Marini, Lasalle (CA); Mark Huzzard Cunningham, Montreal (CA); Francois C. Bisson, Vallee-Jonction (CA); Reza Mohammad Kameshki, Toronto (CA)

(73) Assignee: PRATT & WHITNEY CANADA INC., Longueuil, Quebec ( * ) Notice: Subject to any disclaimer, the term of this patent is extended or adjusted under 35 U.S.C. 154(b) by 0 days.

(21) Appl. No.: 15/137,257

(22) Filed: Apr. 25, 2016

(65) Prior Publication Data

US 2016/0326983 A1    Nov. 10, 2016

Related U.S. Application Data

(63) Continuation-in-part of application No. 14/287,125, filed on May 26, 2014.

(Continued)

(51) Int. Cl.
  *F02K 1/38* (2006.01)
  *F02K 1/48* (2006.01)
  (Continued)

(52) U.S. Cl.
  CPC ............... *F02K 1/48* (2013.01); *F01D 9/041* (2013.01); *F02K 1/386* (2013.01); *F02K 3/06* (2013.01);
  (Continued)

(58) Field of Classification Search
  CPC ... F02K 1/386; F02K 1/48; F02K 1/46; F05D 2250/61; F05D 2240/12; F01D 9/04; F01D 9/041
  (Continued)

(56) References Cited

U.S. PATENT DOCUMENTS 2,844,001 A    7/1958 Alford
3,053,340 A    9/1962 Kutney
(Continued)

FOREIGN PATENT DOCUMENTS

CA    2704366    11/2010
CH    700083    12/2008
(Continued)

*Primary Examiner* — William H Rodriguez
*Assistant Examiner* — Thomas Burke
(74) *Attorney, Agent, or Firm* — Norton Rose Fulbright Canada (57) ABSTRACT

A turbine exhaust case (TEC) of a turbofan aeroengine includes a mixer for mixing exhaust gases with a bypass air stream, the TEC comprising an annular hub and the mixer surrounding the hub, and a plurality of deswirling struts circumferentially spaced apart with respect to a central axis of the TEC and located entirely within an axial length of the mixer. The mixer defines a trailing edge having one or more upstream-most locations thereof where the mixing of the exhausted gases and the bypass air stream begins to take place. The deswirling struts each extend radially across the annular exhaust gas duct and interconnect the mixer and the hub, defining a trailing edge positioned upstream of and axially spaced away from the one or more upstream-most locations of the trailing edge of the mixer.

13 Claims, 5 Drawing Sheets

Related U.S. Application Data (60) Provisional application No. 62/236,177, filed on Oct. 2, 2015.

(51) Int. Cl.
*F02K 3/06* (2006.01)
*F01D 9/04* (2006.01)

(52) U.S. Cl.
CPC ...... *F05D 2210/40* (2013.01); *F05D 2250/61* (2013.01)

(58) Field of Classification Search
USPC .................................................. 181/213, 220
See application file for complete search history.

(56) References Cited

U.S. PATENT DOCUMENTS

| | | | |
|---|---|---|---|
| 3,092,205 A | 6/1963 | Brown et al. | |
| 3,377,804 A | 4/1968 | Wright et al. | |
| 3,712,062 A | 1/1973 | Nash | |
| 4,045,957 A * | 9/1977 | DiSabato | F02K 1/386 60/262 |
| 4,117,671 A * | 10/1978 | Neal | F02K 1/386 239/127.3 |
| 4,149,375 A | 4/1979 | Wynosky et al. | |
| 4,226,085 A * | 10/1980 | Johnson | F02K 1/04 60/262 |
| 4,302,934 A | 12/1981 | Wynosky et al. | |
| 4,335,801 A | 6/1982 | Stachowiak et al. | |
| 4,548,034 A * | 10/1985 | Maguire | F02K 1/386 181/220 |
| 4,819,425 A | 4/1989 | Farquhar et al. | |
| 6,412,283 B1 * | 7/2002 | Sheoran | F02K 1/386 60/770 |
| 6,606,854 B1 * | 8/2003 | Siefker | B63G 13/02 181/213 |
| 6,615,576 B2 | 9/2003 | Sheoran et al. | |
| 7,100,358 B2 | 9/2006 | Gekht et al. | |
| 8,635,875 B2 | 1/2014 | Huzzard Cunningham | |
| 8,826,669 B2 * | 9/2014 | Bouchard | F02K 1/827 181/213 |
| 2004/0068981 A1 | 4/2004 | Siefker et al. | |
| 2004/0255573 A1 * | 12/2004 | Rago | F02K 1/386 60/262 |
| 2006/0010852 A1 * | 1/2006 | Gekht | B23K 15/0093 60/262 |
| 2008/0041033 A1 | 2/2008 | Durocher et al. | |
| 2010/0031631 A1 * | 2/2010 | Ramm | F01D 5/141 60/262 |
| 2011/0036068 A1 * | 2/2011 | Lefebvre | F01D 9/04 60/262 |
| 2011/0265447 A1 * | 11/2011 | Cunningham | F02K 1/48 60/264 |
| 2013/0115076 A1 | 5/2013 | Bouchard et al. | |
| 2015/0075169 A1 | 3/2015 | Cunningham et al. | |
| 2015/0337761 A1 | 11/2015 | Marini et al. | |
| 2016/0153398 A1 | 6/2016 | Lefebvre et al. | |
| 2016/0326983 A1 | 11/2016 | Marini et al. | |

FOREIGN PATENT DOCUMENTS

| | | |
|---|---|---|
| CN | 105781791 | 7/2016 |
| DE | 10145489 | 4/2003 |
| DE | 102007004741 | 8/2008 |
| DE | 102010044483 | 3/2012 |
| EP | 2851516 | 3/2015 |
| GB | 2014665 | 8/1979 |
| JP | 3962978 | 10/2001 |

* cited by examiner

INTEGRATED TEC/MIXER STRUT AXIAL POSITION

CROSS-REFERENCE TO RELATED APPLICATIONS

The present application is a continuation-in-part of U.S. application Ser. No. 14/287,125 filed on May 26, 2014, and also claims priority of U.S. Provisional Application No. 62/236,177, filed on Oct. 2, 2015, which are incorporated herein by reference.

TECHNICAL FIELD

The application relates generally to turbofan aero-engines and, more particularly to an improved turbine exhaust case including a mixer for such engines.

BACKGROUND OF THE ART

Figure 8:
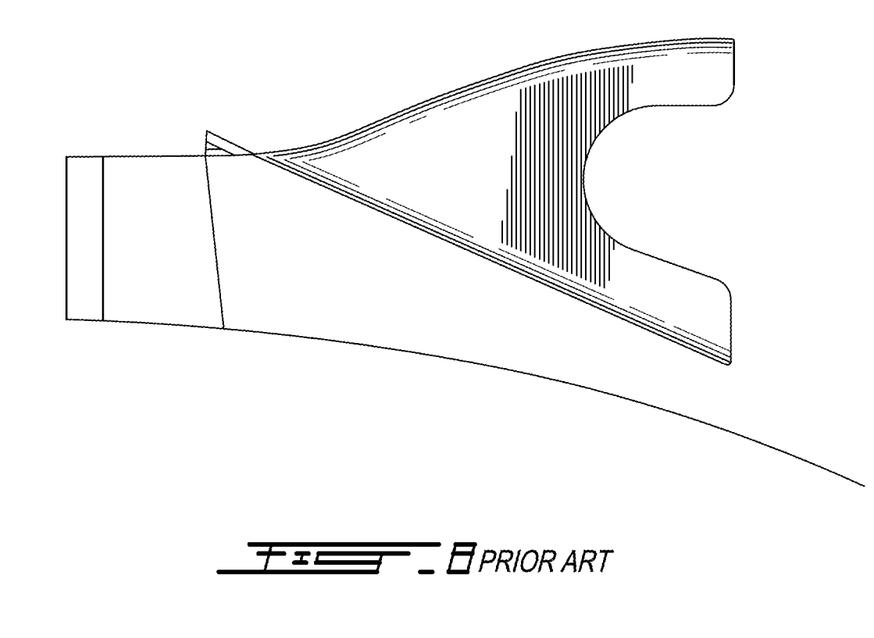
FIG. 8 is a partial cross-sectional view of a turbine exhaust case mixer conventionally attached to the turbine exhaust case downstream of deswirling struts installed within the turbine exhaust case.

In order to increase the effective thrust of turbojet engines, bladed fans have been added to a turbine driven shaft thereof to affect the flow of a quantity of atmospheric air through an annular bypass duct surrounding the turbojet. Hot gases exhausted from the engine core and the bypass airstream are mixed together before expulsion through a single nozzle. In order to perform the mixing function, mixers have been attached to the downstream end of a shroud of the turbine exhaust case (TEC). A swirling flow of exhaust gases from the turbine exit is conventionally deswirled by a plurality of deswirling struts located within the TEC, upstream of the mixer as shown in FIG. 8, such that the exhausted gases are substantially deswirled prior to entering the mixer in order to maximize the performance of the mixer and to promote efficient mixing with minimum pressure losses. Nevertheless, there is room for improvement of such a conventional configuration of deswirling struts and mixer.

Accordingly there is a need to provide an improved mixer.

SUMMARY

In one aspect, there is provided a turbine exhaust case (TEC) of a turbofan aeroengine including an annular mixer for mixing exhaust gases flowing along a radially-inner surface of the mixer with a bypass airstream flowing along a radially-outer surface of the mixer, the TEC comprising: an annular hub and said mixer surrounding the hub, the mixer having a circumferential array of axially extending lobes defined by circumferentially alternating crests and valleys, the crests and valleys diverging from one another beginning at an upstream end of an axial length of the lobes and extending divergently from one another toward and terminating at a trailing edge of the mixer lobes, the trailing edge defining a downstream end of the axial length of the lobes, the trailing edge of the mixer lobes having a lobe trailing edge root defined at an upstream-most location of the lobe trailing edge where mixing of the exhaust gases and the bypass airstream begins, the TEC further comprising a plurality of circumferentially spaced deswirling struts radially extending between the mixer and the hub and located entirely within the axial length of the lobes, a trailing edge of an outer end of the respective deswirling struts intersecting the mixer upstream of said lobe trailing edge root of the mixer.

In another aspect, there is provided a turbofan aeroengine comprising a turbine exhaust case (TEC) positioned downstream of a turbine section for directing a gas flow exhausted from the turbine section, the TEC including an annular hub surrounded by an annular mixer having a circumferentially wavy configuration to form a plurality of axially extending lobes of the mixer, the lobes defining alternating crests and valleys extending divergently to and terminating at a trailing edge of the mixer, the crests defining internal axial passages for directing said exhausted gas flow to pass therethrough along a radially-inner surface of the mixer, and the valleys defining external axial passages for directing a bypass airstream to pass therethrough along a radially-outer surface of the mixer, resulting in a mixing action of said exhausted gas flow and said bypass airstream, the mixing action beginning to take place at one or more upstream-most locations of the trailing edge of the mixer earlier than the remaining locations of the trailing edge of the mixer, a plurality of circumferentially spaced apart deswirling struts radially extending between the mixer and the hub, and located entirely within an axially length of the lobes, a tip point of a trailing edge of the respective deswirling struts being positioned upstream of said one or more upstream-most locations of the trailing edge of the mixer and axially distanced therefrom by a predetermined axial clearance therebetween.

Further details of these and other aspects of the described subject matter will be apparent from the detailed description and drawings included below.

DESCRIPTION OF THE DRAWINGS

Reference is now made to the accompanying figures in which.

It will be noted that throughout the appended drawings in various embodiments, like features are identified by like reference numerals and will not be redundantly described.

DETAILED DESCRIPTION

Figure 1:
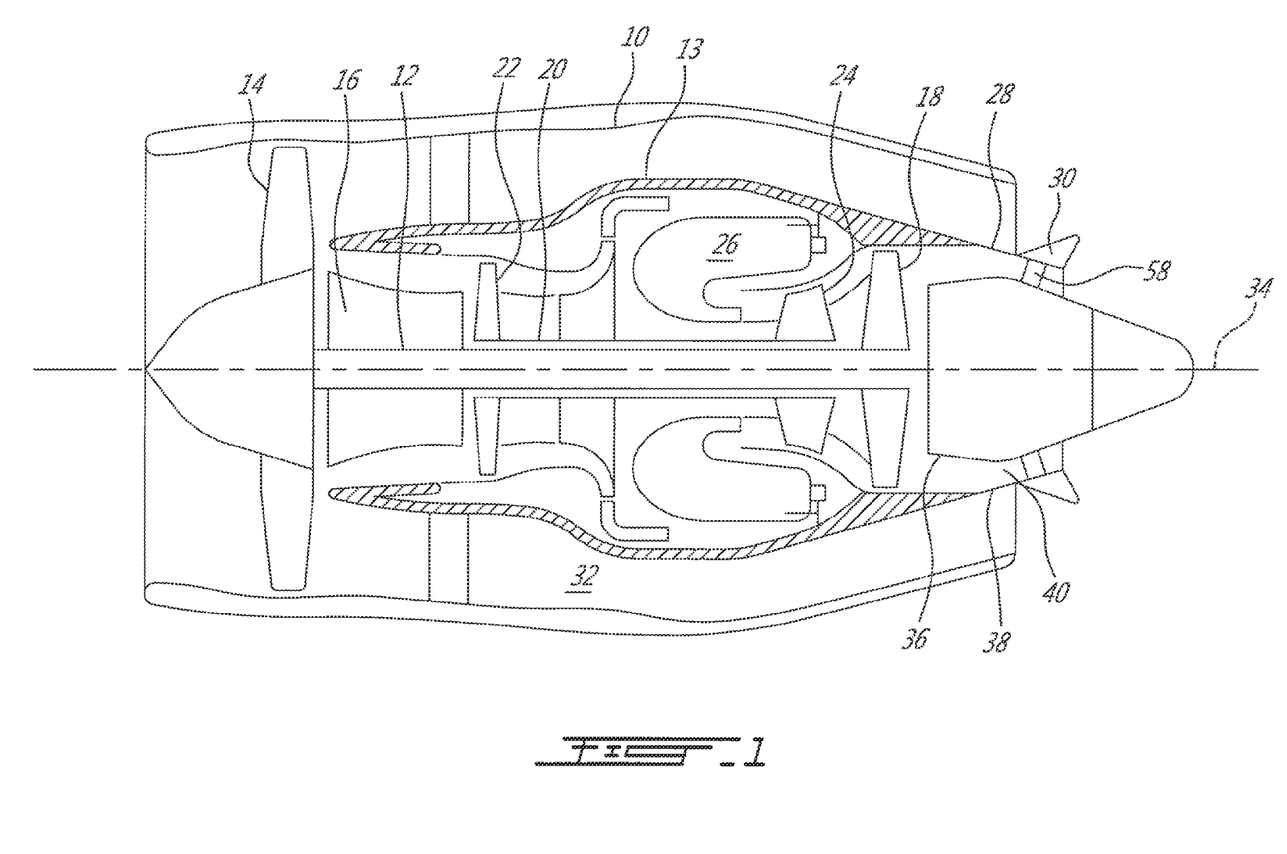
FIG. 1 is a schematic side cross-sectional view of an examplary turbofan aeroengine showing an application of the described subject matter according to one embodiment.

FIG. 1 illustrates an exemplary turbofan aeroengine which includes a nacelle configuration 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not numbered) therethrough. In the main fluid path there is provided a combustion chamber 26 in which a combustion process produces combustion gases to power the high and low turbine pressure assemblies 24 and 18. A turbine exhaust case (TEC) 28 is provided to form a downstream end of the core casing 13 and includes an annular mixer 30 attached thereto to form the downstream end of the TEC 28 for mixing hot exhaust gases discharged from the high and low pressure turbine assemblies 24, 18 through the main fluid path, with a bypass airstream driven by the fan assembly 14 through an annular bypass duct 32 which is defined radially between the nacelle configuration 10 and the core casing 13.

Figure 2:
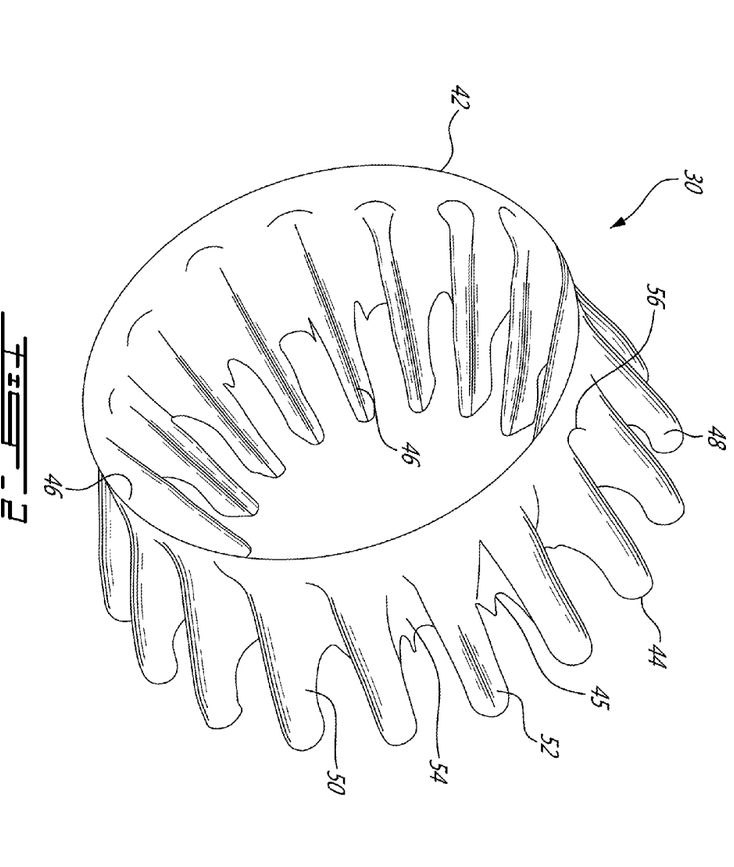
FIG. 2 is a perspective view of a turbine exhaust case mixer according to one embodiment which may be used in the engine of FIG. 1.
Figure 3:
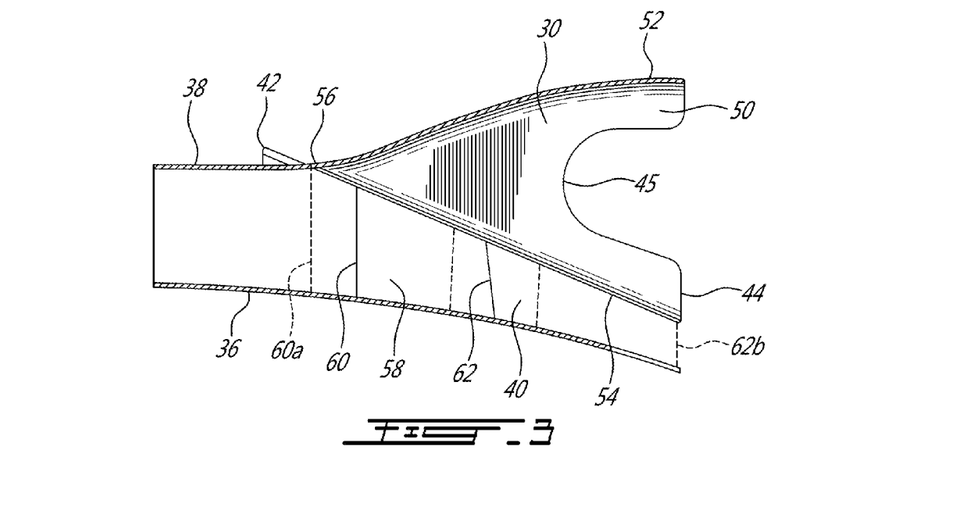
FIG. 3 is a partial cross-sectional view of the engine of FIG. 1, showing another embodiment of the mixer integrated with deswirling struts in an enlarged scale.
Figure 4:
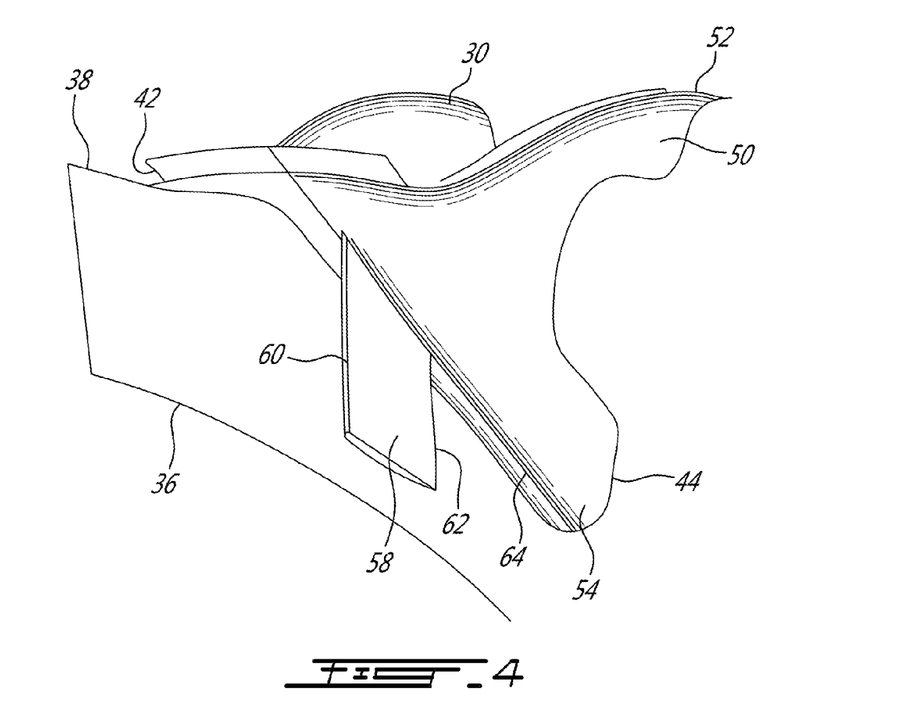
FIG. 4 is a perspective view of the mixer incorporated with the deswirling strut of FIG. 3, with the deswirling strut partially cut away to show a cross-section thereof.

Referring to FIGS. 1-3, the TEC 28 and the mixer 30 define a common central axis 34 which substantially superposes a central rotation axis of the aeroengine. The TEC 28 includes an annular hub 36 and an annular shroud 38 with the annular mixer 30 attached to a downstream end of the shroud 38. The shroud 38 and the mixer 30 surround the hub 36 to form an annular exhaust gas duct 40 disposed radially therebetween.

It should be noted that the terms "upstream" and "downstream" used herein and hereinafter refer to the direction of a fluid flow passing through the main fluid path of the engine. It should also be noted that the terms "axial", "radial" and "circumferential" are used with respect to the central axis 34.

The mixer 30 according to one embodiment such as shown in FIG. 2, may define an annular wavy configuration around the central axis 34 and may axially extend between an upstream end 42 and a downstream end 44 thereof. The annular mixer 30 may include radially-inner and radially-outer flow surfaces 46, 48 extending between the upstream and downstream ends 42, 44 of the mixer 30 and being exposed to the respective hot exhaust gases and bypass airstream. The hot exhaust gases are directed to pass along the inner surface, 46 and the bypass airstream is directed to pass along the outer surface 48. The inner and outer flow surfaces 46, 48 may be in a circumferentially wavy or twisted annular configuration to thereby form a plurality of lobes 50 of the mixer 30. The lobes 50 may be axially extending or axially straight and may define a plurality of alternating crests 52 and valleys 54. In a cross-sectional view as shown in FIG. 3, adjacent crest 52 and valley 54 extend from an axial start location 56 which is close to the upstream end 42 (more clearly shown in FIG. 3), and diverge to the downstream end 44 of the mixer 30.

The radially-inner surface 46 may define inner passageways (not numbered) axially and radially-outwardly along the respective crests 52 for directing the exhaust gases flowing through the annular exhaust gas duct 40. The radially-outer flow surface 48 may define external passageways (not numbered) axially and radially-inwardly along the respective valleys 54 for directing the bypass airstream coming through the annular bypass air duct 32 to flow through the mixer 30. Therefore, the internal and external passageways of the mixer 30 may in combination establish a vortex system downstream of the mixer 30 to encourage mixing between the bypass airstream and the turbine exhaust gases during operation of the aeroengine.

Referring to FIGS. 1 and 3-5, the mixer 30 according to one embodiment may include a plurality of deswirling struts 58 circumferentially spaced apart with respect to the central axis 34. The deswirling struts 58 may be disposed entirely within an axial length of the mixer 30, between the upstream end 42 and the downstream end 44 of the mixer 30. The deswirling struts 58 may extend radially across the annular exhaust gas duct 40 and may interconnect the mixer 30 and the hub 36 of the TEC 28.

The deswirling struts 58 each include a leading edge 60 and a trailing edge 62. The trailing edge 62 of each deswirling strut 58 according to one embodiment may circumferentially align with a bottom of the valley 54 such as a bottom line 64 (see FIG. 4) which is a center line of the valley 54. The deswirling struts 58 according to one embodiment may be axially located in a middle area of the mixer 30 such that the leading edges 60 of the respective deswirling struts 58 are axially spaced away from the start location 56 of the divergently extending crests 52 and valleys 54 and such that the trailing edges 62 of the respective deswirling struts 58 are axially spaced away from a downstream end of the respective valleys 54 of the mixer 30. The downstream end of the respective valleys 54 according to this embodiment are the downstream end 44 of the mixer 30 because the crests 52 and valleys 54 have a substantially equal axial length as shown in FIG. 3. However, if the axial length of the valleys 54 is less than the axial length of the crests 52, the downstream end of the valleys 54 will not be the downstream end of the mixer 30.

Figure 5:
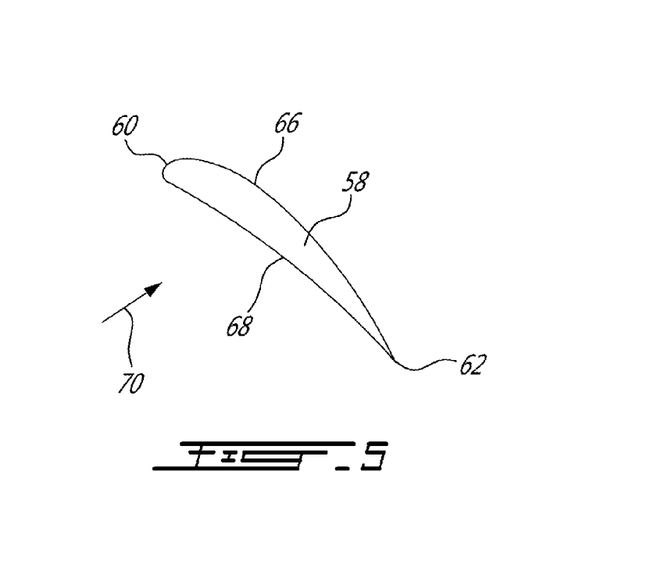
FIG. 5 is a cross-sectional view of the deswirling strut to show the cross-section of the deswirling strut in FIG. 4 having an aerofoil profile.

Optionally, the deswirling struts 58 may each have a cambered profile, for example including a convex side 66 and a concave side 68 extending between the leading and trailing edges 60 and 62 as shown in the cross-sectional view of the deswirling strut 58 in FIG. 5. The struts 58 are cambered in the direction of an incoming swirling flow of the exhaust gases, as indicated by arrow 70 in FIG. 5.

According to one embodiment the deswirling of the swirling flow 70 of the exhaust gases discharged from the low pressure turbine assembly 38 and passing through the annular exhaust gas duct 40, may be accomplished within the mixer 30 by both the deswirling struts 58 and the mixer lobes 50. The swirling flow 70 of exhaust gases passing through the annular exhaust gas duct 40 near the hub 36 may be deswirled by the deswirling struts 58. The swirling flow 70 of the exhaust gases passing through the annular exhaust gas duct 40 near the shroud 38 may be deswirled by the lobes 50 of the mixer 30. With the configuration as described in the above embodiments, the deswirling and mixing functions may be accomplished within a much shorter axial length of the TEC and mixer in contrast to conventional TEC and mixer configurations, thereby advantageously saving engine and nacelle weight. The configuration of the above-described embodiments, can deswirl the swirling flow of exhaust gases and mix the exhaust gases with the bypass air stream with a performance equivalent to or better than that of conventional separate mixer and TEC struts.

The size, shape and position of the deswirling struts may be optimized based on the application and are dependent on the flow conditions including the residual swirl condition from the low pressure turbine assembly 18. The deswirling struts according to the described embodiments may be incorporated into any conventional TEC mixer when the swirl in the exhausted gases is required to be removed. For example, some of the described embodiments may be applicable to TEC mixers in which the axial length of the valleys of the mixers are longer than the axial length of the crests of the mixers.

Alternatively, the deswirling struts 58 may be axially located within the mixer 30 such that the leading edge 60 of each of the deswirling struts 58 axially aligns with the start location 56 of the divergently extending crests 52 and valleys 54, as shown by broken line 60*a* in FIG. 3. Also alternatively, the deswirling struts 58 may be axially located within the mixer 30 such that the trailing edge 62 of each of the deswirling struts 58 axially aligns with the downstream end of the respective valleys 54, as indicated by broken line 62*b* in FIG. 3.

Optionally, each of the valleys 54 of the mixer 30 may be connected with one of the deswirling struts. Also optionally, every second one of the valleys 54 of the mixer 30 may be connected with one of the deswirling struts. Furthermore, the deswirling struts may be circumferentially located at other intervals of the valleys 54 of the mixer 30.

Figure 6:
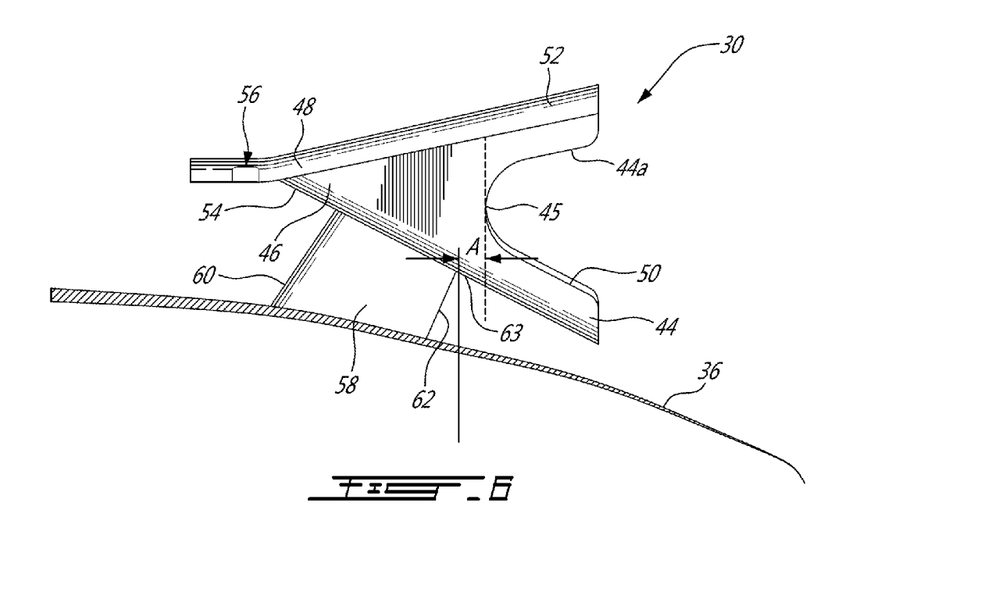
FIG. 6 is a partial cross-sectional view of the engine of FIG. 1, showing a further embodiment of the mixer integrated with deswirling struts in an enlarged scale.
Figure 7:
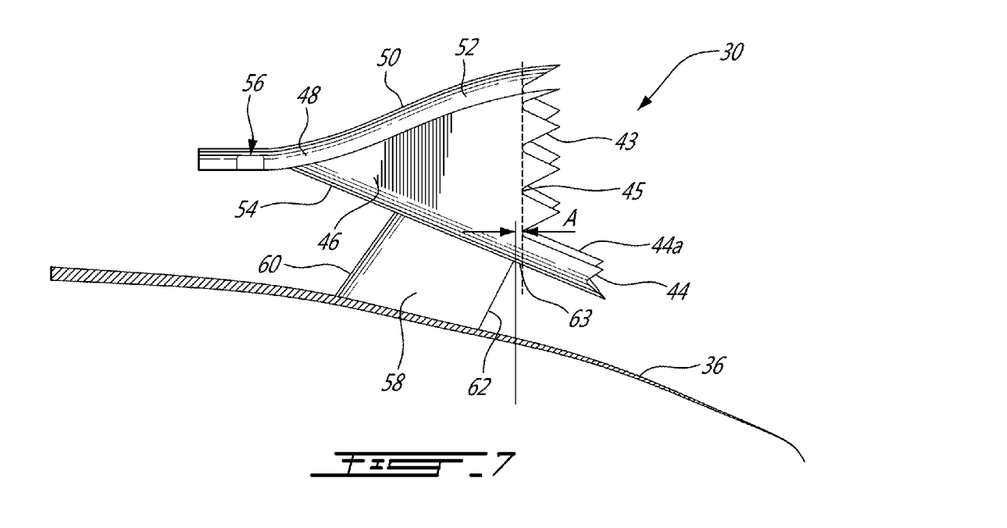
FIG. 7 is a partial cross-sectional view of the engine of FIG. 1, showing a still further embodiment of the mixer integrated with deswirling struts in an enlarged scale.

FIG. 6 illustrates a further embodiment in which the mixer 30 is substantially similar to that shown in FIG. 3, having the crests 52 and valleys 54 diverging from one another beginning at an upstream end of an axial length of the lobes 50 and extending divergently from one another toward and terminating at a trailing edge 44*a* of the downstream end 44 of the mixer 30. The trailing edge 44*a* may also be a trailing edge of the lobes 50 and thus defines a downstream end of the axial length of the lobes 50. The trailing edge 44*a* of the mixer 30 according to this embodiment, may define a closed loop having a scalloped trailing edge profile with a curved trailing edge section extending between the respective adjacent crests 52 and valleys 54 for a mixer lobe trailing edge treatment. The respective curved trailing edge sections of the mixer trailing edge 44*a* may define one or more upstream-most locations 45 (such as in the curved trailing edge section of an identified shape) which is referred to as the mixer lobe trailing edge treatment root. At this trailing edge treatment root, which is as mentioned the upstream-most location of the lobe trailing edge, the mixing action of the hot gases passing along the radially-inner surface 46 and the bypass air stream passing along the radially-outer surface 48 begins to take place earlier than at the remaining locations of the trailing edge 44*a* of the mixer 30. In other words, mixing begins at trailing edge treatment root, and where the root is not at a constant radial location relative to the flow through the mixer, mixing begins at the upstream-most location or root of the lobe trailing edge. In FIG. 6, the trailing edge treatment root or upstream-most location 45 is the base of the scalloped cutout between adjacent crests 52 and valleys 54. Referring momentarily to FIG. 7, the trailing edge treatment root or upstream-most location 45 is at the apex of the triangular cutout(s). Though not depicted, the skilled reader will appreciate that a mixer may also have a planar trailing edge at which mixing occurs across a radially-extending exit plane, i.e. has no cutouts, and that in such case with a linear trailing edge the upstream-most location or root would be anywhere on the radial exit plane.

Recent studies and test data show that the axial position of the integrated TEC struts 58 may affect the mixer lobe trailing edge treatment if the axial position of the TEC struts 58 with respect to the lobe trailing edge treatment root is left uncontrolled, which thereby impacts performance such as thrust reduction.

Therefore, the trailing edge 62 of the respective struts 58 which are located entirely within the axial length of the lobes 50 according to this embodiment, may be positioned upstream of the mixer lobe trailing edge treatment root. For example, a tip point 63 of the strut trailing edge 62 which is a joint or intersection point between the deswirling strut 58 and the mixer 30, may be positioned upstream of the one or more upstream-most locations of the trailing edge treatment root 45 of the mixer trailing edge 44 a, and may be axially distanced from the one or more upstream-most locations 45 by a predetermined axial clearance A as shown in FIG. 6. The axial clearance A, which is the axial distance that the tip point 63 of the deswirling strut trailing edge 62 is positioned axially upstream one or more upstream-most locations of the trailing edge treatment root 45 of the mixer trailing edge 44 a, may be determined differently in various applications. In one example, the clearance A is selected in order to ensure that the core flow of the engine is sufficiently deswirled before reaching the deswirling strut trailing edges 62, without imparting significant radial flow migration caused by the presence of the mixer lobe trailing edge treatment which may otherwise cause a performance impact such as thrust reduction. The leading edge 60 of the respective deswirling struts 58 may be axially aligned with or may be positioned downstream of the start location 56 of the divergently extending crests 52 and valleys 54, depending on flow conditions including upstream low pressure turbine (LPT) residual swirl. In the embodiment shown, the deswirling struts 58 are swept. As shown in FIG. 6, an outer end of the deswirling strut leading edge 60 is located downstream of an inner end thereof.

FIG. 7 illustrates a still further embodiment in which the mixer 30 is similar to that shown in FIG. 3, except that the end 44 of the mixer 30 of this embodiment may define a trailing edge 44*a* in a closed loop having a jagged trailing edge profile formed by a plurality of downstream projecting tabs 43 such as in a triangular "tooth" shape. The mixer lobe trailing edge treatment root may be located between the respective adjacent tabs 43 to define said one or more upstream-most locations 45 of the mixer trailing edge 44*a* where the mixing action of the hot gases passing along the radially-inner surface 46 of the mixer 30 and the bypass airstream passing along the radially-outer surface 48 of the mixer 30 begins to take place earlier than at the remaining locations of the mixer trailing edge 44*a*.

Similar to the embodiment shown in FIG. 6, a tip point 63 of the trailing edge 62 of the respective deswirling struts 58 is positioned upstream of said one or more upstream-most locations 45 of the mixer trailing edge 44*a*, axially distanced therefrom by the predetermined axial clearance A.

Controlling the axial position of the TEC deswirling struts with respect to the mixer lobe trailing edge treatment root to maximize the performance of the integrated TEC/mixer concept, may also be applicable to mixers having other mixer trailing edge profiles, and need not be limited to the mixer trailing edge profiles shown in FIGS. 6 and 7.

The embodiments shown in FIGS. 6 and 7 may also include other features of the integrated TEC/mixer struts as described with reference to FIGS. 2-5, such as cambered cross-section of the deswirling struts, deswirling struts being connected with every one or every second one of the valleys 54 of the mixer 30, etc.

Optionally, the integrated TEC/mixer deswirling struts may also alternate (in various combinations) with a set of secondary trailing edge struts having a smaller axial chord with a lower camber (or no camber), as described in Applicant's co-pending U.S. patent application Ser. No. 14/521,888 filed on Oct. 23, 2014 which is incorporated herein by reference. The combination of the number of airfoils of either the integrated TEC/mixer deswirling struts and/or the secondary trailing edge struts may vary and is dependent on mixer performance requirements.

Similar to the embodiments described with reference to FIGS. 2-5, in the embodiments illustrated in FIGS. 6 and 7 the deswirling and mixing actions are accomplished within a compact axial length which saves engine and nacelle weight, and may achieve performance equivalent to or exceeding that of current state-of-art separate mixers and TEC deswirling struts.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A turbine exhaust case (TEC) of a turbofan aeroengine including a mixer for mixing exhaust gases flowing along a radially-inner surface of the mixer with a bypass airstream flowing along a radially-outer surface of the mixer, the TEC comprising: a hub and said mixer surrounding the hub, the mixer and the hub being annular, the mixer having lobes defining crests and valleys, the lobes being configured in a circumferential array and being axially extending, the crests and valleys being circumferentially alternating, the crests and valleys diverging from one another beginning at an upstream end of an axial length of the lobes and extending divergently from one another toward and terminating at a trailing edge of the lobes, the trailing edge defining a downstream end of the axial length of the lobes, the trailing edge of the lobes having a lobe trailing edge root defined at an upstream-most location of at least one cutout formed in the trailing edge of the lobes where mixing of the exhaust gases and the bypass airstream begins, the TEC further comprising a plurality of circumferentially spaced deswirling struts radially extending between the mixer and the hub and located entirely within the axial length of the lobes, the deswirling struts configured to attenuate a residual swirl condition of the exhaust gases, the residual swirl condition being defined upstream of the mixer and generated by a turbine of the turbofan aeroengine, a trailing edge of an outer end of the respective deswirling struts intersecting the mixer upstream of said upstream-most location of the at least one cutout, wherein the crests and valleys extend divergently from one another from a start location, and wherein a leading edge of the deswirling struts is positioned downstream from the start location.

2. The TEC as defined in claim 1 wherein the at least one cutout defines a scalloped trailing edge profile having a curved trailing edge section extending between respective adjacent crests and valleys, said upstream-most location of the trailing edge of the lobes being defined in the respective curved trailing edge sections.

3. The TEC as defined in claim 1 wherein the at least one cutout defines a jagged trailing edge profile having a plurality of downstream projecting tabs, said upstream-most location of the trailing edge of the lobes being defined between adjacent tabs.

4. The TEC as defined in claim 1 wherein the trailing edge of the respective deswirling struts intersects the mixer at a joint point of the trailing edge of the respective deswirling struts and the mixer.

5. The TEC as defined in claim 1 wherein the trailing edge of each of the deswirling struts is circumferentially aligned with a bottom of one of the valleys.

6. The TEC as defined in claim 1 wherein each of the valleys of the mixer is connected with a corresponding one of the deswirling struts.

7. The TEC as defined in claim 1 wherein every second one of the valleys of the mixer is connected with a corresponding one of the deswirling struts.

8. The TEC as defined in claim 1 wherein the deswirling struts are each cambered in a direction of an incoming swirling flow of the exhaust gases.

9. A turbofan aeroengine comprising a turbine exhaust case (TEC) positioned downstream of a turbine section for directing a gas flow exhausted from the turbine section, the TEC including a hub surrounded by a mixer having a circumferentially wavy configuration to form a plurality of axially extending lobes of the mixer, the mixer and the hub being annular, the lobes defining alternating crests and valleys extending divergently to and terminating at a trailing edge of the mixer, the crests defining internal axial passages for directing said exhausted gas flow to pass therethrough along a radially-inner surface of the mixer, and the valleys defining external axial passages for directing a bypass airstream to pass therethrough along a radially-outer surface of the mixer, resulting in a mixing action of said exhausted gas flow and said bypass airstream, the mixing action beginning to take place at one or more upstream-most locations of one or more cutouts formed in the trailing edge of the mixer earlier than at remaining locations of the trailing edge of the mixer, a plurality of circumferentially spaced apart deswirling struts radially extending between the mixer and the hub, and located entirely within an axial length of the lobes, the deswirling struts configured to attenuate a residual swirl condition of the exhaust gases, the residual swirl condition being defined upstream of the mixer and generated by the turbine section of the turbofan aeroengine, a tip point of a trailing edge of the respective deswirling struts being positioned upstream of said one or more upstream-most locations of the one or more cutouts formed in the trailing edge of the mixer and axially distanced therefrom by a predetermined axial clearance therebetween, wherein the crests and valleys extend divergently from one another from a start location, and wherein a leading edge of the deswirling struts is positioned downstream from the start location.

10. The turbofan aeroengine as defined in claim 9 wherein the one or more cutouts define a scalloped trailing edge profile having a curved trailing edge section extending between respective adjacent crests and valleys, said one or more upstream-most locations of the trailing edge of the mixer being defined in the respective curved trailing edge sections.

11. The turbofan aeroengine as defined in claim 9 wherein the one or more cutouts define a jagged trailing edge profile having a plurality of downstream projecting tabs, said one or more upstream-most locations of the trailing edge of the mixer being defined between adjacent tabs.

12. The turbofan aeroengine as defined in claim 9 wherein the tip point of the trailing edge of the respective deswirling struts is a joint point of the trailing edge of the respective deswirling struts and the mixer.

13. The turbofan aeroengine as defined in claim 9 wherein the trailing edge of each of the deswirling struts is circumferentially aligned with a bottom of one of the valleys.

* * * * *